Nov. 17, 1970      H. G. HAMRE      3,541,550
                  WARNING DEVICE

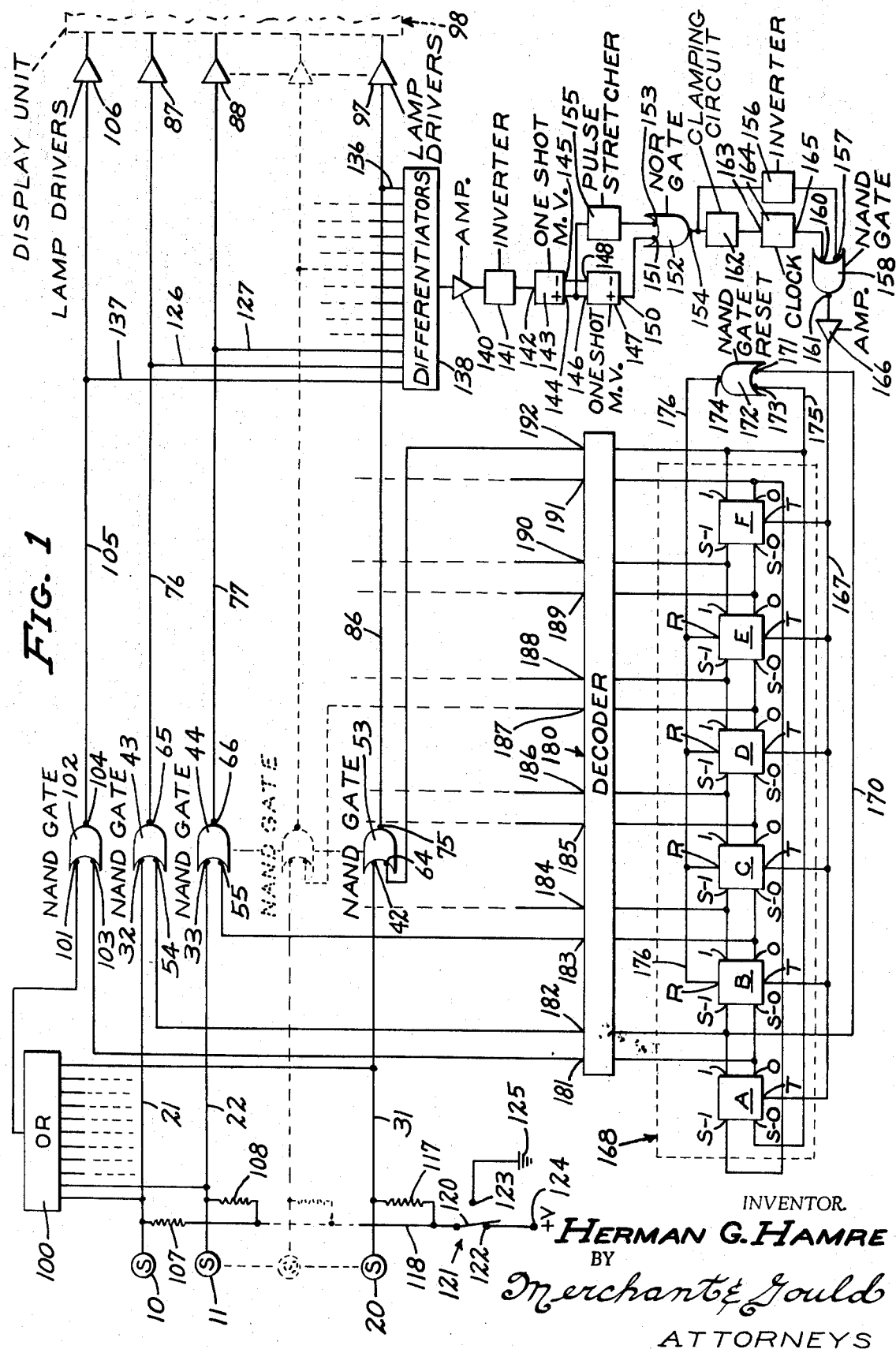

Filed May 25, 1967                  2 Sheets-Sheet 2

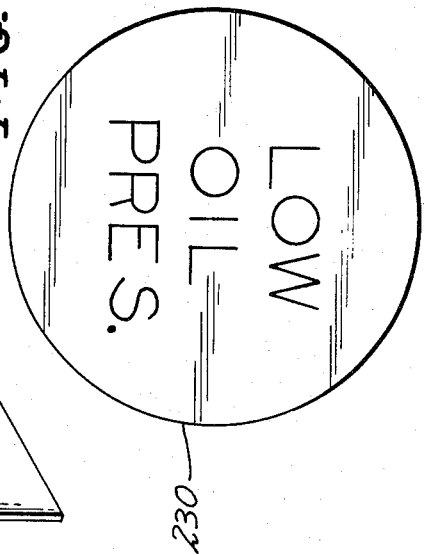

FIG. 3

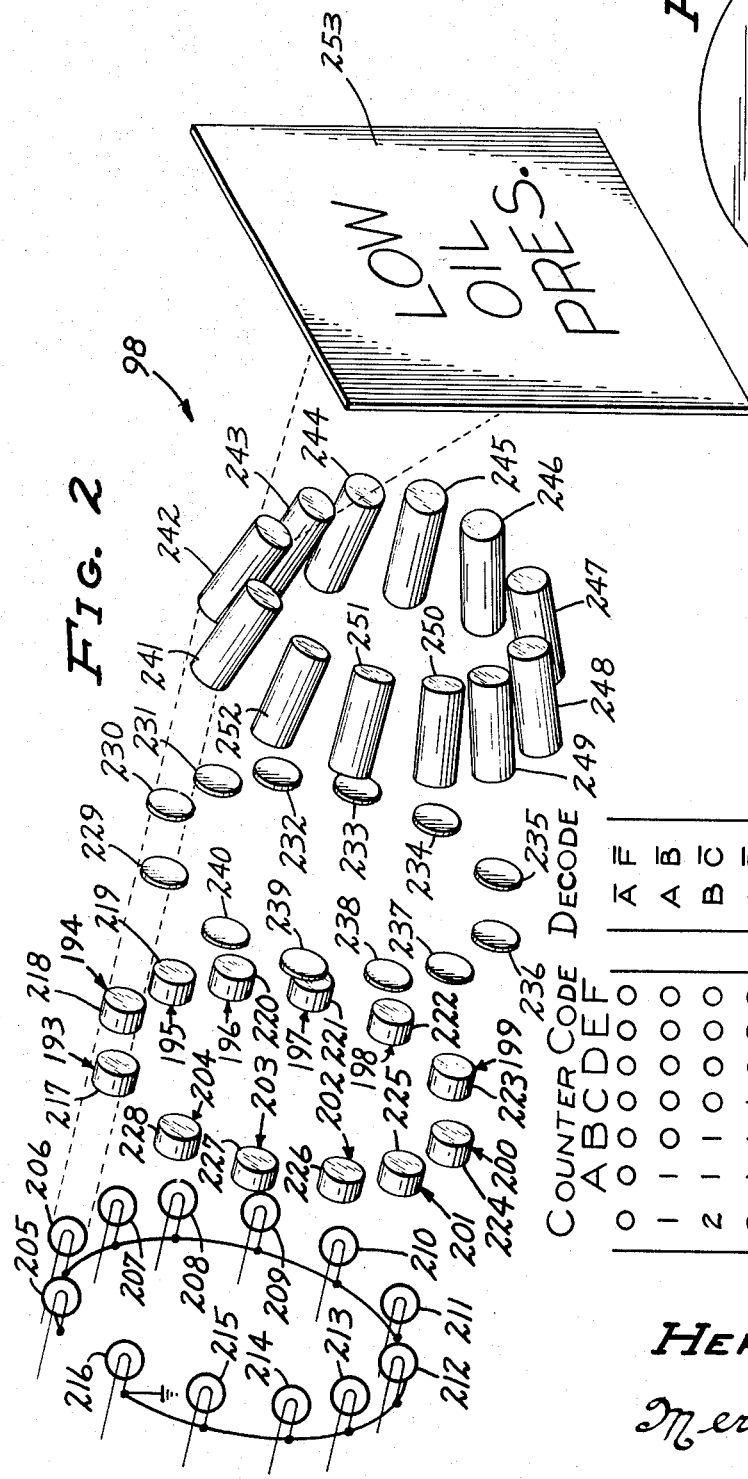

| COUNTER CODE | DECODE | $\bar{A}$ $\bar{F}$ | $A$ $\bar{B}$ | $B$ $\bar{C}$ | $C$ $\bar{D}$ | $D$ $\bar{E}$ | $E$ $\bar{F}$ | $\bar{A}$ $F$ | $\bar{A}$ $B$ | $\bar{B}$ $C$ | $\bar{C}$ $D$ | $\bar{D}$ $E$ | $\bar{E}$ $F$ |
|---|---|---|---|---|---|---|---|---|---|---|---|---|---|
| A B C D E F | | O O O O O O | O O O O O | O O O O | O O O | O O | O | — | — | — | — | — | — |
| O O O O O O | | O O O O O | O O O O | O O O | O O | O | — | — | — | — | — | — | O |
| O O O O O O | | O O O O | O O O | O O | O | — | — | — | — | — | O | O |
| O O O O O O | | O O O | O O | O | — | — | — | — | — | O | O | O |
| O O O O O O | | O O | O | — | — | — | — | — | O | O | O | O |
| O O O O O O | | O | — | — | — | — | — | O | O | O | O | O |
| 0 1 2 3 4 5 6 7 8 9 10 11 | | | | | | | | | | | | | |

INVENTOR.
HERMAN G. HAMRE
BY
*Merchant & Gould*
ATTORNEYS

United States Patent Office 3,541,550
Patented Nov. 17, 1970

3,541,550
WARNING DEVICE
Herman G. Hamre, Coon Rapids, Minn., assignor to Dynacom Corp., St. Paul, Minn., a corporation of Minnesota
Filed May 25, 1967, Ser. No. 641,184
Int. Cl. G08b 19/00; G09f 9/00
U.S. Cl. 340—413
8 Claims

ABSTRACT OF THE DISCLOSURE

A failure warning device having a plurality of fault sensors each of which produce an output signal upon the occurrence of a particular malfunction. Each of the fault sensors are connected to a first input of a different one of a plurality of gating circuits, the gating circuits producing an output signal only when a second signal is applied to a second input thereof and a malfunction associated with its particular fault indicator is occurring. The second input of each of the gating circuits is connected to a scanning circuit which continuously and sequentially applies an enabling signal to the second input of the gating circuits. The outputs of each of the gating circuits are connected to indicator means to indicate when a given fault or malfunction has occurred.

BACKGROUND OF THE INVENTION

Failure warning devices have been known in the prior art. However, prior art systems suffered from several disadvantages, such as excessive complexity, excessive weight and bulkiness, and for many applications, extreme cost. Furthermore, many of the prior devices utilized an annunciator panel type of fault indicator which further contributed to the space requirements of the systems and therefore limited their use, while at the same time making the systems difficult and confusing to operate and more susceptible to human error in readout.

By an annunciator panel type of fault indicator is meant that type of indicator which uses a separate indicating device to indicate each different fault sensed by the system. This type of readout may use several different types of indicators, such as a light, or a bell, and will have a separate light or bell associated with each fault to be sensed. The various indicating devices may be spaced at various areas of a control panel, and thereby requires a rather large sized instrument panel to incorporate the various indicating devices, and further makes it difficult for the operator to know immediately what portion of the system is not operating properly when a fault is indicated.

For example, if the fault indicating system is to be used in an airplane, the pilot must known instantly what portion of the aircraft is not operating properly so that corrective steps can be taken. Since the pilot has many other duties to perform in flying the aircraft, it is essential that a fault warning system be as simple as possible, and not constitute a distraction to the pilot. With the annunciator panel type of readout, the control panel of the aircraft becomes considerably cluttered with various lights which indicate particular faults. Upon the occurrence of a fault the light on the control panel will be energized, and the pilot must then stop to determine which particular fault is indicated by the energization of the particular light. This is a time-consuming process and often subject to human error. Furthermore, since these annunciator systems require a considerable amount of space for installation, these types of systems are limited to use on rather large sized aircraft and are not susceptible to use on the small or privately owned plane.

The present invention provides a highly reliable yet simple fault sensing system which requires a minimum of space for installation and which can display all faults or failures at a single screen. Since the system is relatively simple, the cost is low and provides a fault sensing system that can be used in small privately owned aircraft. While the present invention will be described in conjunction with its use in aircraft, it is to be understood that the invention is not limited to this use, and can be used for sensing faults or failures in almost any type of situation. For example, the small size of the system makes it particularly useful in the installation of boats and other marine vessels. At the same time, the system is particularly adapted to sensing faults in diesel locomotives, or for use in process control in industrial operations. Indeed, the system is also particularly adapted for use in burglar or other types of alarm systems where it is desired to monitor numerous remote areas from a central security department.

SUMMARY OF THE INVENTION

In the present invention a plurality of sensing devices are mounted to sense the occurrence of faults or failures which may occur in a particular system. For example, if the invention is used on an aircraft, one sensor might be positioned to sense an increase in engine temperature above an acceptable level, another sensor located to indicate a drop or loss of oil pressure, still another sensor mounted to indicate that the aircraft wheels are not down during a landing, and so forth.

The output of each of the sensors is connected to a first input of a coincident gate circuit, each coincident gate circuit having a first and a second input. There are a plurality of coincident gate circuits so that each sensor is connected to a separate gate circuit. Upon the occurrence of a particular fault, the sensor positioned to sense the fault occurrence will produce an output signal which will be fed to the first input of its associated gate circuit. However, the gate circuit will not produce an output signal at this time, since the coincident gate circuits will only produce an output when there is an input signal present at both of their inputs simultaneously.

A high speed scanning circuit is provided which is connected to the second input of each of the coincident gate circuits, and which continually applies pulses to the coincident gate circuits in a sequential order. When the scanning circuit applies a pulse to the second input of the gate circuit connected to the sensor that is monitoring the system failure or fault, the gate circuit will have a pulse at both of its inputs and will produce an output signal. This output signal is fed to an indicator, which in the form disclosed in the present invention comprises a plurality of projecting systems all focused on a single readout screen. Each of the projecting systems has a film strip or reticle having a predetermined message thereon suitable for indicating the particular fault being monitored by its associated sensor. For example, the reticle or film strip associated with the sensor that is monitoring aircraft oil pressure would have the message "Low Oil Pressure," or some similar message. The output of the gate circuit will energize the projection lamp associated with the projection system and will display the message on the readout screen. The output from the gate circuit also momentarily inhibits the scanning circuit to hold the message on the screen for a predetermined time, for example, 1 second. After the predetermined inhibit time the scanner will again scan through the entire system and when it returns to the system indicating a fault, for example, the oil pressure fault indicated above, the message will again be displayed on the screen providing the fault still exists. If more than one failure is occurring at the same time, the failures will be indicated on the readout screen in sequential order.

It is one object of the present invention, therefore, to provide an improved failure warning device.

It is another object of the present invention to provide an improved failure warning device wherein a plurality of fault or failure sensing devices are continually scanned in a sequential order to determine if a fault has occurred.

It is a further object of the present invention to provide a failure warning device wherein the occurrence of any fault within the system is displayed at a single readout.

These and other objects of my invention will become apparent to those skilled in the art upon consideration of the accompanying specification, claims, and drawings.

BRIEF DESCRIPTION OF THE DRAWINGS

Referring to the drawings, wherein like numerals represent like parts throughout the several views:

FIG. 1 is a block diagram representation of the electronic portion of the present invention;

FIG. 2 is a diagrammatic view in exploded perspective of the indicator portion of the present invention;

FIG. 3 is a diagrammatic representation of a film strip or reticle used in the indicator portion of the present invention disclosed in FIG. 2; and FIG. 4 is a table showing the code used in a counter and decoder portion of the present invention.

DESCRIPTION OF THE PREFERRED EMBODIMENT

Referring to FIG. 1 there is shown a plurality of fault or failure sensors 10, 11, . . . 20. In FIG. 1 there are only three sensors shown in full line and one sensor shown in dotted lines; however, it should be understood that in the present invention any number of desired sensors can be used, and the present disclosure is based on a system using 11 sensors and a common "warning" channel for a total of 12 display channels. If the present invention is to be utilized in monitoring the operation of an aircraft, the sensors 10, 11, . . . 20 would be positioned throughout the aircraft to sense or monitor the most important areas of aircraft operation. For example, sensor 10 might be poistioned to monitor the aircraft oil pressure and to produce an output signal in the event that the oil pressure dropped below an acceptable level, while sensor 11 may be positioned to monitor engine temperature, the remainder of the sensors positioned to monitor other critical operational points of the aircraft.

The output of sensors 10, 11, . . . 20 are respectively connected by means of conductors 21, 22, . . . 31 to inputs 32, 33, . . . 42 of NAND gates 43, 44, . . . 53. NAND gates 43, 44, . . . 53 further have second inputs 54, 55, . . . 64 and outputs 65, 66, . . . 75, respectively.

The NAND gates 43, 44, . . . 53, and other NAND gates utilized in the present invention, are conventional gate circuits and are of a coincidence type, that is, the NAND gates will produce an output signal at their outputs only when there are simultaneous input signals at both of their inputs.

The outputs 65, 66, . . . 75 of NAND gates 43, 44, . . . 53 are respectively serially connected by means of conductors 76, 77, . . . 86 and lamp driver amplifiers 87, 88, . . . 97 to an indicator unit 98. Indicator unit 98 will be described in more detail hereinafter.

The conductors 21, 22, . . . 31 are connected through an OR gate 100 to an input 101 of a NAND gate 102. NAND gate 102 further has a second input 103 and an output 104. Output 104 of NAND gate 102 is connected by means of a conductor 105 in series with a lamp driver amplifier 106 to the indicator unit 98.

The conductors 21, 22, . . . 31 are respectively connected by means of resistors 107, 108, . . . 117 to a common conductor 118. Common conductor 118 is connected ot a movable contact 120 of a switch 121. Switch 121 further has a fixed contact 122 and a fixed contact 123. Fixed contact 122 is connected to a fixed source of positive voltage 124, while fixed contact 123 of switch 121 is connected to ground 125.

The conductor 76, 77, . . . 86 and 105 are respectively connected by means of conductors 126, 127, . . . 136 and 137 to differentiators 138. The outputs of differentiators 138 are connected by means of an amplifier 140 in series with an inverter 141 to the input 142 of a one shot multivibrator 143. One shot multivibrator 143 has a first output 144 and a second output 145. Output 144 of one shot multivibrator 143 is connected to an input 146 of a one shot multivibrator 147, while output 145 of one shot multivibrator 143 is connected to a second input 148 of one shot multivibrator 147. An output 150 of one shot multivibrator 147 is connected to an input 151 of a NOR gate 152. NOR gate 152 further has an input 153 and an output 154. Output 144 of one shot multivibrator 143 is connected by means of a pulse stretcher 155 to the input 153 of NOR gate 152.

The output 154 of NOR gate 152 is connected through an inverter 156 to an input 157 of a NAND gate 158. NAND gate 158 further has an input 160 and an output 161.

Output 154 of NOR gate 152 is further connected through a clamping circuit 162 to an inhibit input 163 of a clock pulse generating circuit 164. Clock pulse generating circuit 164 has an output 165 which is connected to the input 160 of NAND gate 158.

Differentiators 138, amplifier 140, inverter 141, one shot multivibrator 143, one shot multivibrator 147, pulse stretcher 155, clamping circuit 162, inverter 156, and NAND gate 158 all comprise an inhibit circuit for momentarily inhibiting the clock pulse generating circuit 164, as well as momentarily inhibiting any output pulses from the clock pulse generating circuit 164 from passing through NAND gate 158.

The output 161 of NAND gate 158 is connected through an amplifier 166 and a conductor 167 to the input of a counter circuit 168. Counter 168 will include a plurality of individual stages, the number of stages being determined by the size of the entire warning system, and the number of sensors used. In the present disclosure the counter contains six bistable stages designated A, B, C, D, E, and F. Each of the bistable stages has a trigger input T, a set–1 input S–1, a set–0 input S–0, a 1 output, and a 0 output. In addition, bistable stages B, C, D, and E each have a reset input R. The output pulses from the clock generating circuit 164 are fed through the NAND gate 158 and the amplifier 166, and conductor 167 to the trigger inputs T of each of the bistable circuits of counter 168. The 1 output of each of the bistable stages A, B, C, D, and E of counter 168 is connected to the set–1 input S–1 of the next bistable stage, that is, the 1 output of stage A is connected to the set–1 input S–1 of the bistable stage B, the 1 output of bistable stage B is connected to the set–1 input S–1 of bistable stage C, and so forth. However, the 1 output of bistable stage F is reversed so that this output is connected to the set–0 input S–0 of the first bistable stage A. Similarly, the 0 output of each of the bistable stages A, B, C, D, and E are connected to the set–0 inputs S–0 of the next bistable stage, that is, the 0 output of bistable stage A is connected to the set–0 input S–0 of bistable stage B, the 0 output of bistable stage B is connected to the set-0 input S–0 of bistable stage C, and so forth. However, the 0 output of the bistable stage F of counter 168 is again reversed, the 0 output of bistable stage F being connected to the set–1 input S–1 of bistable stage A.

The 1 output of bistable stage A is connected by means of a conductor 170 to an input 171 of a NAND gate 172. NAND gate 172 further has an input 173 and an output 174. The 1 output of bistable stage F of counter 168 is connected by means of a conductor 175 to the input 173 of NAND gate 172. The output 174 of NAND gate 172 is connected by means of a conductor 176 to the reset inputs R of bistable stages B, C, D, and E of counter 168.

As explained previously, the output pulses from the clock pulse generating circuit 164 are simultaneously fed to the trigger inputs T of each of the bistable stages A through F of counter 168. The bistable stages A through F of counter 168 are such that the stages will shift from their 0 state to their 1 state only when an input is present at the set–1 input S–1 of the bistable stage, and any of the bistable stages that are already in the 1 state will remain in the 1 state if there is an input at the set–1 input S–1 of that stage. Each of the stages will shift from the 1 state to the 0 state upon an input pulse at its trigger input if there is also an input at the set–0 input S–0 of the bistable stage.

FIG. 4 shows a chart of the counter code, as well as the decoding system which will be described hereinafter. The counter 168 operates as follows. Assume that the counter is in the 0 state, that is, each of its individual bistable stages A through F is in the 0 state, as shown in line 0 of FIG. 4. In this condition there is an output from the 0 output of each of the stages, and stages B, C, D, E and F will not change states upon an input pulse at its trigger T input. However, the 0 output of stage F is fed to the set–1 input S–1 of stage A so that upon the occurrence of an output pulse from the clock pulse generating circuit 164 to the trigger input T of stage A, stage A will shift from its 0 state to its 1 state, resulting in the counter condition shown in line 1 of FIG. 4. Since stage A is now in its 1 state, the output from the 1 output of stage A is fed to the set–1 input S–1 of stage B, so that upon the occurrence of the next output pulse from the clock pulse generating circuit stage B will also shift from its 0 state to its 1 state resulting in the condition set forth in line 2 of FIG. 4. Similarly, since the output from the 1 output of stage B is connected to the set–1 input S–1 of stage C, the next output pulse from the clock pulse generating circuit 164 will change the state of bistable stage C from a 0 to a 1 resulting in the counter condition shown in line 3 of FIG. 4. Each succeeding clock pulse from the clock pulse generating circuit will cause the state of the counter 168 to change as set forth in the counter code table of FIG. 4, until after the counter has reached the state set forth in line 11 of FIG. 4. The next pulse from the clock pulse generating circuit will return the counter 168 to a completely 0 state set forth in the 0 line of FIG. 4.

The 1 outputs of binary stages A and F of counter 168 are connected by means of conductors 170 and 175 through NAND gate 172 to the reset R inputs of binary stages B, C, D and E of counter 168 in order to insure that counter 168 follows the proper sequence of operation as set forth in the counter code of the table of FIG. 4. Whenever binary stages A and F are in the 1 state, NAND gate 172 will produce an output that will force the stages B, C, D, and E also to assume the 1 state, thereby resulting in counter 168 assuming the counter operating conditions set forth in line 6 of the table of FIG. 4. From then on the counter will follow the proper sequence of operation. This correction circuit is necessary in the event that upon initial energization of the circuit, some transient condition would cause the binary stages of counter 168 to assume erroneous conditions, or a different sequence of operation than that set forth in FIG. 4.

The 1 and 0 outputs of each of the binary stages A through F of counter 168 are connected to a decoder circuit 180. Decoder circuit 180 comprises a plurality of two input, single output, AND gates (not shown). The number of AND gates of decoder 180 is determined by the number of sensors making up the warning system. In the present case the decoder would comprise twelve AND gates. The 1 and 0 outputs of the binary stages A through F of counter 168 are connected to the two input AND gates of decoder 180 in the manner set forth in the decode column of the table of FIG. 4. In other words, the first AND gate of the decoder would have the $\overline{A}$ and $\overline{F}$ outputs of counter 168 connected to its inputs. $\overline{A}$ and $\overline{F}$ are the 0 outputs of the A binary stage and the F binary stage, respectively. Similarly, the second AND gate of the decoder 180 would be connected to the A and $\overline{B}$ outputs of the A and B binary stages of counter 168, the A output being the 1 output from the A binary stage and the $\overline{B}$ being the 0 output of binary stage B of counter 168.

The decoder 180 has twelve output lines 181, 182, 183, . . . 192. Output 181 of decoder 180 is connected to the input 103 of NAND gate 102, while outputs 182, 183, . . . 192 of decoder 180 are connected to inputs 54, 55, . . . 64 of NAND gates 43, 44, . . . 53, respectively.

FIG. 2 is an exploded perspective of the indicator unit 98 and shows a plurality of projectors 193 through 204. The projectors 193 through 204, respectively, comprise projection lamps 205 through 216, condensing lenses 217 through 228, film strips or reticles 229 through 240, and projection lens assemblies 241 through 252. Projection lens assemblies 241 through 252 include both field lenses and projection lenses. The projectors 193 through 204 all focus on a single screen 253. A sample of the film strip or reticle 230 is shown in enlarged form in FIG. 3.

The output of lamp driver amplifier 106 is connected to projector lamp 205, while the outputs of lamp drivers 87 through 97 are connected to projector lamps 206 through 216 of indicator unit 98, respectively.

In operation, the sensors 10 through 20 are positioned at various parts of the aircraft to sense specific operations of the aircraft and to note any failures or variation from normal operation. In the event of a failure, the sensor will produce an output signal which will be fed to one input of the NAND gate. For example, assume that the sensor 10 is positioned to sense the aircraft oil pressure and to produce an output in the event the oil pressure drops below an acceptable level. In the event of a drop in aircraft oil pressure, the output signal from the sensor 10 will be fed to the input 32 of NAND gate 43. However, NAND gate 43 will only produce an output signal when there is an input to both its inputs 32 and 54; therefore, NAND gate 43 does not immediately produce an output signal. The clock pulse generating circuit 164 is producing an output signal. The clock pulse generating circuit 164 is producing clock pulses that are fed through NAND gate 158 and amplifier 166 to the counter 168. The counter 168 will repetitively count through a predetermined number of counts. The decoder 180 is connected to sense the particular count in the counter 168 and to produce an output pulse on its output lines 181 through 192 in a sequential order. When an output pulse appears at the output 182 of decoder 180, this pulse will be coupled to the input 54 of NAND gate 43 and NAND gate 43 will produce an output at its output 65 which will be coupled through conductor 76 and lamp driver amplifier 87 to energize the projection lamp 206 of projector 194. When projection lamp 206 is energized, projector 194 will project the message on film strip 230 onto the screen 253 which is mounted in the instrument panel of the aircraft. This message will indicate to the pilot that the aircraft's oil pressure is low, and allow the pilot to take corrective action.

At the same time that the output of sensor 10 is fed to the input 32 of NAND gate 43 it is also fed through OR gate 100 to the input 101 of NAND gate 102. When the scanning pulse appears at the output 181 of decoder 180 this pulse will be coupled to input 103 of NAND gate 102, whereupon NAND gate 102 will produpce an output signal at its output 104 which will be coupled through conductor 105 and lamp driver 106 to energize lamp 205 of projector 193. The film strip or reticle 229 of projector 193 contains the message "warning" and is usually projected in a different color, such as red, than the message indicating the particular trouble, such as low oil pressure.

The outputs of the NAND gates are utilized to temporarily inhibit the scanning function so that the message will be projected on screen 253 for a predetermined amount of time. For example, the output from NAND gate 43 appearing in conductor 76 is coupled through connector 126 and is differentiated by a differentiator in the differentiator's circuit 138. The differentiated output is amplified by amplifier 140, inverted by inverter 141, and triggers a one shot multivibrator 143. Upon triggering, one shot multivibrator 143 produces an output signal at its output 144 which is coupled through pulse stretcher 155 and NOR gate 152 to activate a clamping circuit 162 which clamps one side of the free running multivibrator clock pulse generator 164 to stop the generation of clock pulses. At the same time, the output 154 of NOR gate 152 is coupled through an inverter 156 to the input 157 of NAND gate 158. This signal inhibits NAND gate 158 and prohibits any spuriously generated clock pulses from being transmitted to the counter 168. When one shot multivibrator 143 resets, the resetting triggers one shot multivibrator 147 which produces an output at its output 150 which is also conducted through NOR gate 152 to activate the clamping circuit 162 and to hold the clock pulse generator 164 shut off. The pulse stretcher 155 stretches the output pulse from one shot multivibrator 143 to cover the overlap between the shut off of one shot 143 and the turn on of one shot 147. One shot multivbrators 143 and 147 can be designed so that they hold the clock pulse generating circuit 164 shut off for any desired period of time, for example, one second. During the time that the clock pulse generating circuit 164 is held in an off condition, the count in the counter 168 remains constant, and the output pulse from the decoder 180 is held on a specific output, thereby insuring that the message being projected on the screen 253 is held for the predetermined amount of time, for example, one second.

If more than one fault should be occurring at a given time, the various faults will be projected in sequential order on the screen 253, the faults being preceded by the warning indication.

Switch 121 is a push to test switch, and in its normal position the movable contact 120 is in engagement with fixed contact 122, thereby applying a positive voltage to each of the conductors 21, 22, . . . 31. When movable contact 120 of switch 121 is moved into engagement with fixed contact 123, the conductors 21, 22, . . . 31 are connected to ground 125, thereby simulating the output signals from the sensors 10, 11, . . . 20, and the scanning signals from the output of decoder 180 scan the system through its entire range to indicate whether or not the system is functioning properly.

I claim as my invention:
1. Failure warning apparatus comprising:
 (a) a plurality of fault sensors, each adapted to sense the occurrence of an individual fault and to produce an output signal in response thereto;
 (b) a plurality of gate circuits, each of said gate circuits having a first and second input and an output, each of said gate circuits producing an output signal only upon the simultaneous occurrence of input signals to both its first and second inputs;
 (c) means respectively connecting the output of a different one of said fault sensors to said first input of a different one of said gate circuits;
 (d) scanning means connected to the second input of each of said gate circuits to continually apply an input signal to the second input of each of said gate circuits in a sequential order;
 (e) an indicator means having a predetermined viewing area and having a plurality of specific display means therein, each identifying a fault sensor; and
 (f) means connecting each display means to the output of a related gate circuit for sequential activation to indicate the occurrence of a particular fault in said viewing area.

2. Failure warning apparatus as defined in claim 1 wherein said scanning means comprises:
 (a) a clock pulse generating circuit adapted to produce output pulses at a predetermined frequency;
 (b) a counter circuit for counting input pulses applied thereto, said counter adapted to repetitively count from zero to a predetermined count;
 (c) means connecting the output of said clock pulse generating circuit to said counter circuit;
 (d) a decoder circuit having a plurality of outputs equal to the number of gate circuits, said decoder circuit being connected to said counter to sense the count in said counter and to produce an output signal at a different one of its outputs in response to each different count of said counter; and
 (e) means respectively connecting a different one of the outputs of said decoder to the second input of each said gate circuits.

3. Failure warning apparatus as defined in claim 1 wherein said predetermined viewing area is a single projection screen and said plurality of specific display means are a plurality of projectors each having a projection lamp, a film slide containing a message indicative of a particular fault, and a projecting lens, all of said plurality of projectors being arranged to project on said single projection screen.

4. Failure warning apparatus of claim 2 including inhibit means connected to the outputs of all said gate circuits and to said clock pulse generating circuit to inhibit the output pulse from said clock pulse generating circuit for a predetermined time in response to an output from the gate circuits.

5. Failure warning apparatus of claim 1 including inhibit means connected to the outputs of all said gate circuits and to said scanning means to momentarily inhibit the sequential application of said input signals to the second input of each of said gate circuits in response to an output from the gate circuits.

6. Failure warning apparatus of claim 1 wherein one of said gate circuits has its first input connected to the outputs of all of said fault sensors and wherein said indication means indicates a warning in response to an output from said one of said gate circuits.

7. Failure warning apparatus of claim 1 including test means connected to the first inputs of each of said gate circuits and adapted, upon command, to apply a simulated fault signal to the first input of each of said gate circuits.

8. Failure warning apparatus as described in claim 4 wherein said means, connecting the output of said clock pulse generating circuit to said counter, includes a coincident gate having a first input connected to the output of said clock pulse generating circuit, a second input connected to said inhibit means and an output connected to said counter circuit.

References Cited
UNITED STATES PATENTS

| 2,738,491 | 3/1956 | Mihalakis | 340—27 |
| 3,041,600 | 6/1962 | Gumpertz | 340—324 |
| 3,087,144 | 4/1963 | Bianchi | 340—413 |
| 3,120,758 | 2/1964 | Craddock | 340—413 |
| 3,188,621 | 6/1965 | Cogar | 340—413 |
| 3,402,404 | 9/1968 | Burley | 340—413 |

THOMAS B. HABECKER, Primary Examiner

U.S. Cl. X.R.

340—27, 52, 270, 324